United States Patent [19]
Hartman et al.

[11] 4,245,890
[45] Jan. 20, 1981

[54] GRADIENT INDEX OF REFRACTION FOR MISSILE SEEKERS

[75] Inventors: Richard L. Hartman; Bob D. Guenther, both of Huntsville, Ala.

[73] Assignee: The United States of America as represented by the Secretary of the Army, Washington, D.C.

[21] Appl. No.: 327

[22] Filed: Jan. 2, 1979

[51] Int. Cl.[3] ........................ F42B 15/02; G02B 1/12; G02B 3/04

[52] U.S. Cl. ............................ 350/175 GN; 244/3.16; 350/319

[58] Field of Search ........................ 350/175 GN, 319; 244/3.16

[56] References Cited

U.S. PATENT DOCUMENTS

| | | | |
|---|---|---|---|
| 2,216,965 | 10/1940 | Sukumlyn | 350/175 GN |
| 3,486,808 | 12/1969 | Hamblen | 350/175 GN |
| 3,634,219 | 1/1972 | Sinai | 350/175 GN X |
| 3,873,408 | 3/1975 | Hensler | 350/175 GN X |
| 4,022,855 | 5/1977 | Hamblen | 350/175 GN X |
| 4,036,453 | 7/1977 | Evans et al. | 244/3.16 |

FOREIGN PATENT DOCUMENTS

| | | | |
|---|---|---|---|
| 378691 | 7/1964 | Switzerland | 244/3.16 |

*Primary Examiner*—John K. Corbin
*Assistant Examiner*—Scott J. Sugarman
*Attorney, Agent, or Firm*—Nathan Edelberg; Robert P. Gibson; Harold W. Hilton

[57] ABSTRACT

A missile having a sensor in the nose thereof. The nose is in the shape of a transparent ogive window which has an index of refraction that assumes different values at different positions on the window whereas the window appears to the sensor as if it were a hemispherical window.

5 Claims, 2 Drawing Figures

GRADIENT INDEX OF REFRACTION FOR MISSILE SEEKERS

BACKGROUND OF THE INVENTION

Gradient index glass has been used to make the "Woods's Lens". In the prior art, the index of refraction of a flat piece of glass is increased toward the center, in such a way that the flat glass focuses the light. In this application, a reversed index is used to make a curved ogive have the optical properties.

Current laser designator weapon systems are required to use hemispherical shaped windows on the seeker to obtain the necessary optical quality for guidance. The aerodynamic performance of the missile is reduced because the hemispherical shape introduces a large drag coefficient.

The seeker window of the present invention is constructed with an index of refraction which varies as a function of position off the axis of the cylindrical missile.

The window as set forth herein reduces the drag coefficient on laser designator weapons and increases their effective range without a reduction in the optical performance.

SUMMARY OF THE INVENTION

A missile having a sensor element in the nose portion for receiving electromagnetic radiation. The radiation is emitted from the target and the missile homes in on the radiation to impact with the target. An ogive shaped transparent window encloses the sensor. The window is found with a non-uniform index of refraction that varies at different positions on the window so that the ogive window appears to the seeker as a hemispherical window.

DESCRIPTION OF THE PREFERRED EMBODIMENT

Figure 1:
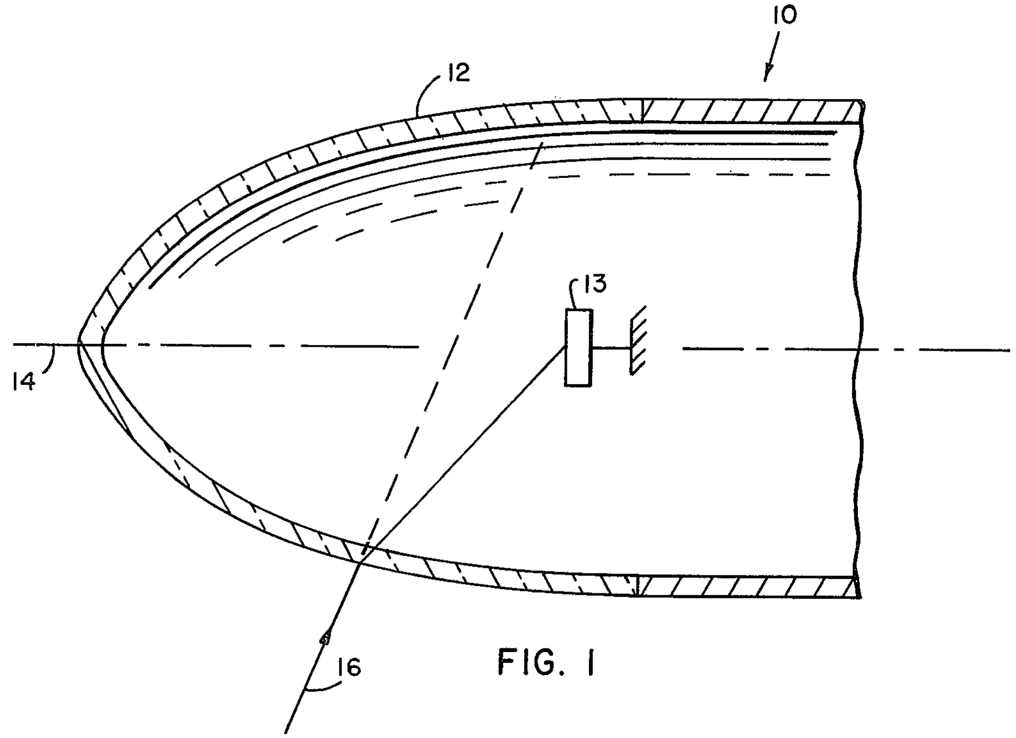
FIG. 1 is an elevational diagrammatic view illustrating the missile nose enclosing the sensor.

As shown in FIG. 1, a missile 10 includes a transparent nose 12 which defines a window for enclosing a sensor 13 mounted in gimballed relation along the missile axis 14. A ray of light 16 is illustrated as passing through the window to strike sensor 13. The light is received from a target (not shown) which has been illustrated by a laser designator.

Figure 2:
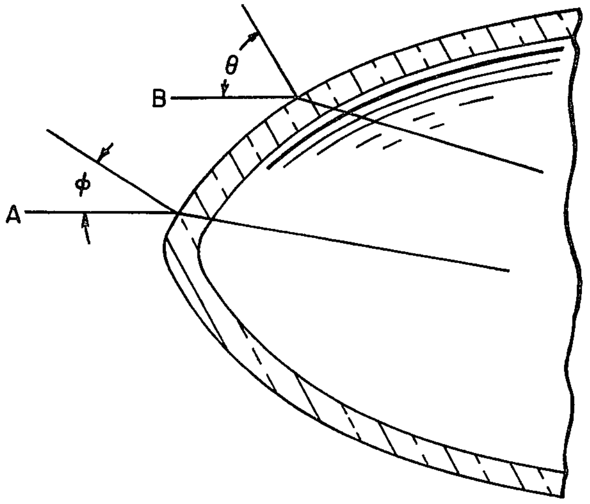
FIG. 2 is a view similar to FIG. 1 illustrating the effect of two rays striking the ogive window.

As seen in FIG. 2, ray B strikes at a more oblique angle $\theta$, than ray A, at angle $\phi$. If the surface has uniform thickness, ray B is delayed more than ray A, so the wavefronts are bent or distorted. If the material has a varying index of refraction n, so that $n_a$ is greater than $n_b$ to the extent that each ray is delayed in time the same amount, then the wavefront is not distorted (Fermat's principle). In practice the optical design will consider both the shape of the inside and outside surface, the thickness as a function of location, and the index of refraction gradient to trade-off distortion and field of view.

The ogive shaped sensor window is constructed in accordance with the required aerodynamic performance of the missile. The index of refraction of the sensor window is not uniform over the window but rather assumes different values at different positions on the window. The gradient of the index of refraction (i.e., the change in index of refraction from point to point) will be determined by both the geometrical shape of the window and the required optical performance of the window. For example, current missile systems use windows with rotational symmetry, thus, the gradient required will also have rotational symmetry. As an improvement to current missile systems, the optical performance of the window must be such that it appears to the seeker as if it were a hemispherical window.

A gradient index may be formulated in glass by heating the glass in contact with a salt, so that an ion-exchange diffusion takes place. The biggest change takes place close to the surface, so a gradient of the index created. A gradient index may be introduced in a plastic by photopolymerization. A plastic (poly-methyl-methacrylate) can be sensitized with a dye. Exposure to light then effects the polymeric bonds, changing the size of the molecules of polymer, and thus the index of refraction.

Gradient indexes can also be created by neutron irradiation, chemical vapor deposition, and ion implantation.

The gradient index window is designed to replace several correcting elements needed in the current design of a laser designator. This results in a weight savings as well as providing improved performance. The simplest implementation is to design the gradient index window to provide optical performance equivalent to a hemispherical window. To use the device, the conventional hemispherical window would be removed and the ogive shaped gradient index window would be installed.

We claim:

1. A missile having an electromagnetic radiation sensor element in the forward portion thereof for receiving radiation and homing thereon comprising, an ogive shaped nose inclosing said sensor, said ogive shape providing an aerodynamic surface of minimum drag during flight of said missile, said nose being a transparent window and having a non-uniform index of refraction that varies at different positions on said window to simulate a hemispherical window.

2. A missile as in claim 1 wherein the gradient of said index of refraction is defined by the geometrical shape and required optical performance of said window.

3. A missile as in claim 2 wherein said window is comprised of glass having ions diffused therein.

4. A missile as in claim 2 wherein said window is plastic and said gradient of index of refraction therein is produced by photopolymerization of said plastic.

5. A missile as in claim 2 wherein said window is plastic and said gradient of index of refraction therein is produced by electron bombardment of said plastic.

* * * * *